United States Patent
Sharp et al.

(10) Patent No.: US 10,055,418 B2
(45) Date of Patent: Aug. 21, 2018

(54) NARROWING INFORMATION SEARCH RESULTS FOR PRESENTATION TO A USER

(71) Applicant: Highspot, Inc., Seattle, WA (US)

(72) Inventors: Oliver Sharp, Seattle, WA (US); David Wortendyke, Seattle, WA (US); Scot Gellock, Seattle, WA (US); Robert Wahbe, Seattle, WA (US)

(73) Assignee: Highspot, Inc., Seattle, WA (US)

( * ) Notice: Subject to any disclaimer, the term of this patent is extended or adjusted under 35 U.S.C. 154(b) by 235 days.

(21) Appl. No.: 14/658,062

(22) Filed: Mar. 13, 2015

(65) Prior Publication Data

US 2015/0261758 A1    Sep. 17, 2015

Related U.S. Application Data

(60) Provisional application No. 61/953,258, filed on Mar. 14, 2014.

(51) Int. Cl.
*G06F 17/30* (2006.01)
(52) U.S. Cl.
CPC .................................. *G06F 17/301* (2013.01)
(58) Field of Classification Search
CPC combination set(s) only.
See application file for complete search history.

(56) References Cited

U.S. PATENT DOCUMENTS

| | | | |
|---|---|---|---|
| 7,814,425 B1 | 10/2010 | O'Shaugnessy et al. | |
| 7,970,721 B2 | 6/2011 | Leskovec et al. | |
| 8,014,634 B1 | 9/2011 | Chan | |
| 8,402,375 B1 | 3/2013 | Skare et al. | |
| 8,447,760 B1 | 5/2013 | Tong | |
| 8,510,313 B2 | 8/2013 | Vaughan et al. | |
| 8,554,601 B1 | 10/2013 | Marsh et al. | |
| 8,872,804 B2 | 10/2014 | Cummings et al. | |
| 2004/0267700 A1 | 12/2004 | Dumais et al. | |
| 2005/0267799 A1 | 12/2005 | Chan et al. | |
| 2006/0085427 A1 | 4/2006 | D'Urso | |

(Continued)

FOREIGN PATENT DOCUMENTS

JP    2012185780 A    9/2012

OTHER PUBLICATIONS

International Search Report and Written Opinion for International Application No. PCT/US2013/076962, dated Apr. 22, 2014, 11 pages.

(Continued)

*Primary Examiner* — Shyue Jiunn Hwa
(74) *Attorney, Agent, or Firm* — Perkins Coie LLP

(57) ABSTRACT

The disclosed technology provides systems and methods for filtering information based on a set of properties. The information consists of a set of items that the user is interacting with, such as documents, presentations, audio and video files, and the like. The properties can be specified by the user (by, for example, putting a set of items in lists and folders), based on actions taken by users in the system (such as commenting on, or liking, or viewing an item), or can represent a variety of other characteristics. Related properties can also be grouped together. Furthermore, the disclosed techniques provide mechanisms for automatically identifying useful properties and providing an indication of those useful properties to a user to use in narrowing results.

20 Claims, 16 Drawing Sheets

(56) References Cited

U.S. PATENT DOCUMENTS

| | | |
|---|---|---|
| 2006/0129538 A1 | 6/2006 | Baader et al. |
| 2006/0248045 A1* | 11/2006 | Toledano .......... G06F 17/30463 |
| 2007/0033517 A1 | 2/2007 | O'Shaughnessy et al. |
| 2007/0079384 A1* | 4/2007 | Grinstein .............. G06F 21/629 726/27 |
| 2007/0088820 A1 | 4/2007 | Kwak et al. |
| 2007/0150515 A1 | 6/2007 | Brave et al. |
| 2008/0154873 A1* | 6/2008 | Redlich ............. G06F 17/30864 |
| 2008/0306954 A1 | 12/2008 | Hornqvist |
| 2009/0019026 A1 | 1/2009 | Valdes-Perez et al. |
| 2009/0106697 A1 | 4/2009 | Ward et al. |
| 2009/0164431 A1 | 6/2009 | Zivkovic et al. |
| 2009/0178144 A1* | 7/2009 | Redlich ............... G06F 21/6209 726/27 |
| 2009/0222551 A1 | 9/2009 | Neely et al. |
| 2010/0070488 A1 | 3/2010 | Sylvain |
| 2010/0082622 A1 | 4/2010 | Irie et al. |
| 2010/0146593 A1 | 6/2010 | Stahl et al. |
| 2010/0198869 A1 | 8/2010 | Kalaboukis et al. |
| 2010/0235351 A1 | 9/2010 | Iwasa et al. |
| 2010/0250556 A1 | 9/2010 | Park et al. |
| 2010/0281389 A1 | 11/2010 | Hutchinson et al. |
| 2011/0107260 A1 | 5/2011 | Park et al. |
| 2011/0191679 A1 | 8/2011 | Lin et al. |
| 2011/0225153 A1 | 9/2011 | Haseyama et al. |
| 2011/0238754 A1 | 9/2011 | Dasilva et al. |
| 2011/0251875 A1* | 10/2011 | Cosman ............... G06Q 10/087 705/7.31 |
| 2012/0001919 A1 | 1/2012 | Lumer |
| 2012/0066645 A1 | 3/2012 | Laurie et al. |
| 2012/0117475 A1 | 5/2012 | Lee et al. |
| 2012/0131495 A1 | 5/2012 | Goossens et al. |
| 2012/0143859 A1 | 6/2012 | Lymperopoulos et al. |
| 2012/0158751 A1 | 6/2012 | Tseng et al. |
| 2012/0191715 A1 | 7/2012 | Ruffner et al. |
| 2012/0197855 A1 | 8/2012 | Chen et al. |
| 2012/0271819 A1 | 10/2012 | Qiu et al. |
| 2012/0278329 A1 | 11/2012 | Borggaard et al. |
| 2012/0278761 A1 | 11/2012 | John |
| 2012/0290565 A1 | 11/2012 | Wana et al. |
| 2012/0290614 A1 | 11/2012 | Nandakumar et al. |
| 2012/0310926 A1 | 12/2012 | Gannu et al. |
| 2012/0313948 A1 | 12/2012 | Bergman et al. |
| 2013/0036114 A1 | 2/2013 | Wong et al. |
| 2013/0054583 A1 | 2/2013 | Macklem et al. |
| 2013/0110813 A1 | 5/2013 | Holm et al. |
| 2013/0124653 A1 | 5/2013 | Vick et al. |
| 2013/0218923 A1 | 8/2013 | Kaul et al. |
| 2013/0254280 A1 | 9/2013 | Yang et al. |
| 2013/0268479 A1 | 10/2013 | Andler et al. |
| 2014/0006399 A1 | 1/2014 | Vasudevan et al. |
| 2014/0089048 A1 | 3/2014 | Bruich et al. |
| 2014/0089402 A1 | 3/2014 | Liyanage et al. |
| 2014/0189516 A1 | 7/2014 | Guo et al. |
| 2014/0359424 A1 | 12/2014 | Lin et al. |
| 2015/0177933 A1 | 6/2015 | Cueto |
| 2016/0042253 A1 | 2/2016 | Matei et al. |
| 2016/0162591 A1 | 6/2016 | Dokania et al. |

OTHER PUBLICATIONS

International Search Report and Written Opinion for International Application No. PCT/US2014029505, dated Jul. 7, 2014, 11 pages.

Screenshot of main page of Speaker Deck website. Taken Dec. 10, 2014 https://speakerdeck.com/.

Screenshot of Frequently Asked Questions page of Speaker Deck website. Taken Dec. 10, 2014 https://speakerdeck.com/faq#file_types.

* cited by examiner

NARROWING INFORMATION SEARCH RESULTS FOR PRESENTATION TO A USER

RELATED APPLICATIONS

This application claims the benefit of U.S. Provisional Patent Application No. 61/953,258, filed on Mar. 14, 2014, entitled NARROWING INFORMATION SEARCH RESULTS FOR PRESENTATION TO A USER, which is herein incorporated by reference in its entirety.

This application is related to U.S. patent application Ser. No. 14/136,322 filed on Dec. 20, 2013, entitled "INTEREST GRAPH-POWERED SEARCH," U.S. Patent Provisional Application No. 61/745,365 filed on Dec. 21, 2012, entitled "INTEREST GRAPH-POWERED SEARCH," U.S. Provisional Patent Application No. 61/800,042, filed Mar. 15, 2013, entitled "INTEREST GRAPH-POWERED FEED," U.S. Provisional Patent Application No. 61/800,322, filed Mar. 15, 2013, entitled "INTEREST GRAPH-POWERED BROWSING," U.S. Provisional Patent Application No. 61/800,497, filed Mar. 15, 2013, entitled "INTEREST GRAPH-POWERED SHARING," and U.S. Provisional Patent Application No. 61/914,266, filed Dec. 10, 2013, entitled "SKIM PREVIEW," each of which is herein incorporated by reference in its entirety.

BRIEF DESCRIPTION OF THE DRAWINGS

FIG. 1B is a display screen showing search results.

FIG. 1C is a display screen showing narrowing of search results.

FIGS. 2A and 2B are display screens showing an ability for user-specified groupings of information.

FIG. 3 is a display screen showing the following of spots or people.

FIG. 5 is a display screen showing types of display documents.

FIG. 6 is a display screen showing items viewed, commented on, etc.

FIG. 7 is a display screen showing automatic suggestions of items for display to a user.

FIG. 8 is a display screen showing presentation of a search box to a user.

DETAILED DESCRIPTION

Overview

Figure 1A:
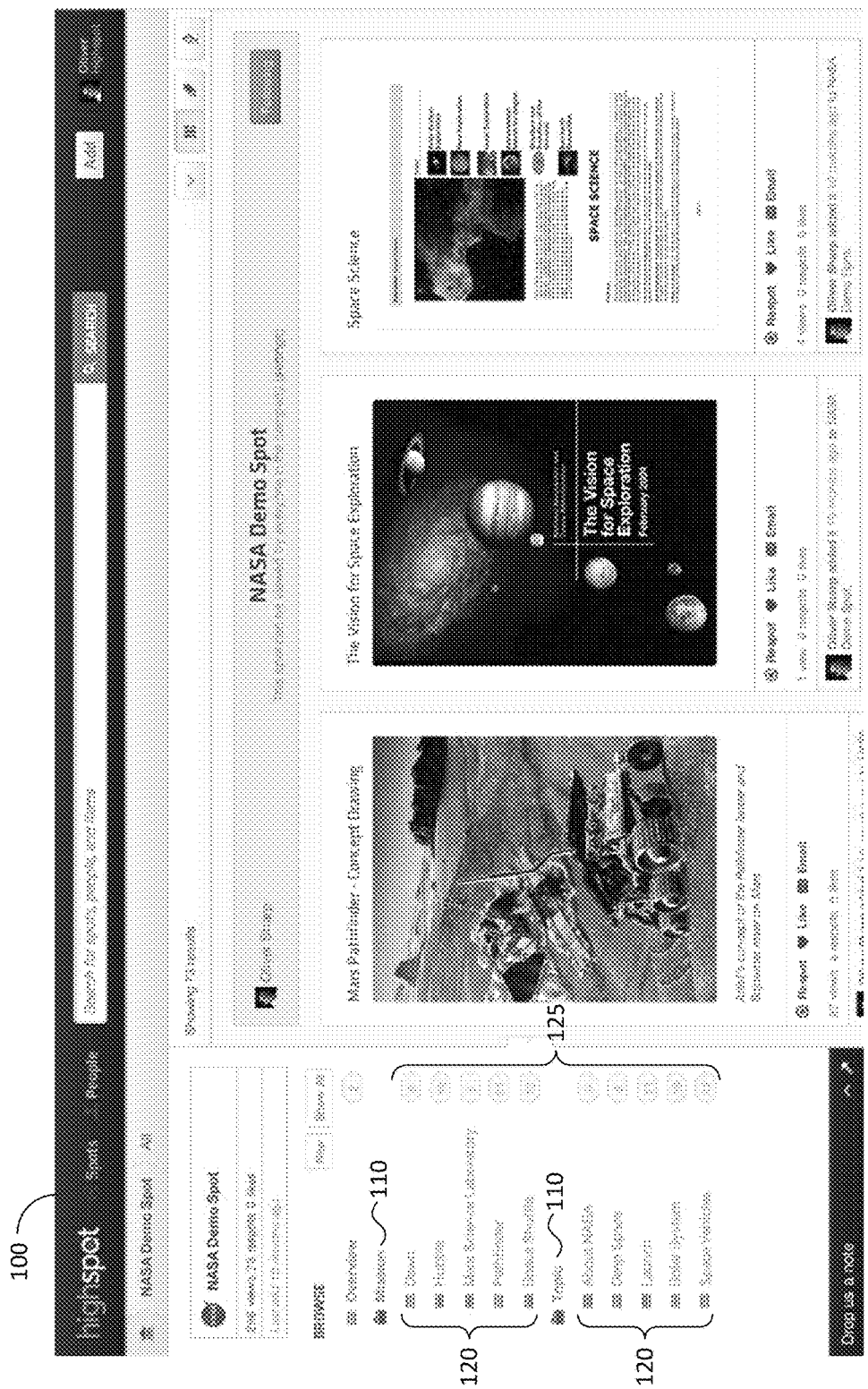
FIG. 1A is a display page illustrating an example of a collection of information or a "spot" for display to a user.

A narrow-by facility providing system, methods, and mechanism for filtering information based on a set of properties is described below, and referred to at times as narrow-by. The information consists of a set of items that the user is interacting with, such as documents, presentations, audio and video files, and the like. The properties can be specified by the user (by, for example, putting a set of items in lists and folders), based on actions taken by users in the system (such as commenting on, or liking, or viewing an item), or they can represent a variety of other characteristics. Related properties can also be grouped together. Furthermore, the disclosed techniques provide mechanisms for automatically identifying useful properties and providing an indication of those useful properties to a user to use in narrowing results.

When any set of items is being presented, the system may automatically compute which properties are useful for narrowing it down. These useful properties are presented to the user, who can select from among them. The system also informs the user how many items will remain if any option is selected. Upon selection by the user, the result set is then narrowed down to just those items that match. This is a fast way to reduce a set of items to the ones that the user wishes to see or act upon. Narrow-by can be used to help users perform a variety of applications, including searching, browsing, and managing sets of items.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may be emphasized below; however, any terminology intended to be interpreted in any restricted manner will be overtly and specifically defined as such in this Detailed Description section.

In general, narrow-by is a technique for reducing a set of items, representing business information, to ones that a user wishes to see or to act upon. The described system takes an item set and, based on various properties of those items, presents properties that are useful for narrowing down the set. The system computes a number of items that will be available if any of those properties are selected. The resulting list of properties is presented to the user, who can optionally select properties to refine the set of results.

A goal of narrow-by is to reduce the full result set. A particular property is deemed to be "useful" in this context if it applies to a non-zero proper subset of the current result set—in other words, it applies to more than zero of the items but fewer than the total number of items. In some embodiments, a property may be determined to be useful if it applies to more than zero items but fewer than some predetermined threshold number or percentage of the total number of items, such as 1000 items, 10,000 items, 75% of the total number of items, 99% of the total number of items, and so on. When the user selects such a property, indicating that only items with that property should be shown, the number of items in the result set will be reduced, but not to zero.

Narrow-by is a powerful tool for viewing and managing business information. For example, FIG. 1A shows a NASA spot 100, i.e., a collection of information items related to space exploration. A spot is the name used herein for a collection of items, typically related to one another. This particular spot is organized using item folders 110 (such as "Mission") and item lists 120 (such as "Pathfinder"). Items in the spot can be placed into lists so that any particular item may be in zero, one, or many item lists at the same time. An item list may be grouped with others in an item folder, or it can be stand-alone (as shown in the example, with the list "Overview"). Such stand-alone lists are called top-level lists.

Figure 1B:
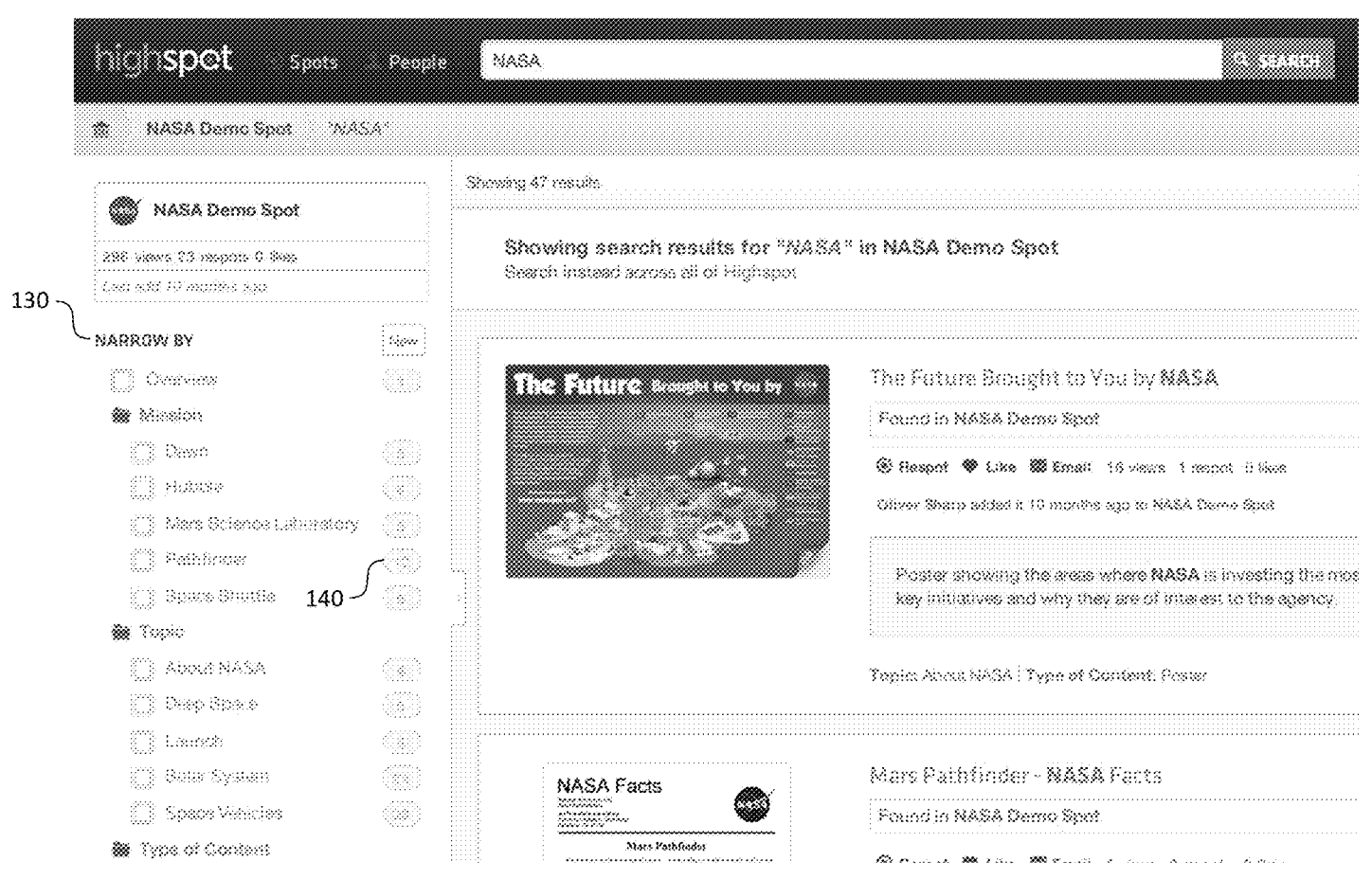

FIG. 1B shows results of searching for the word "NASA" in this spot. The narrow-by area 130 of the screen is called out. The search yielded 47 results across the spot. Because those items have been put in a variety of item lists and item folders, the system determines that the result set can be narrowed down. For example, it shows that 12 of the 47 results are in the item list "Pathfinder."

Figure 1C:
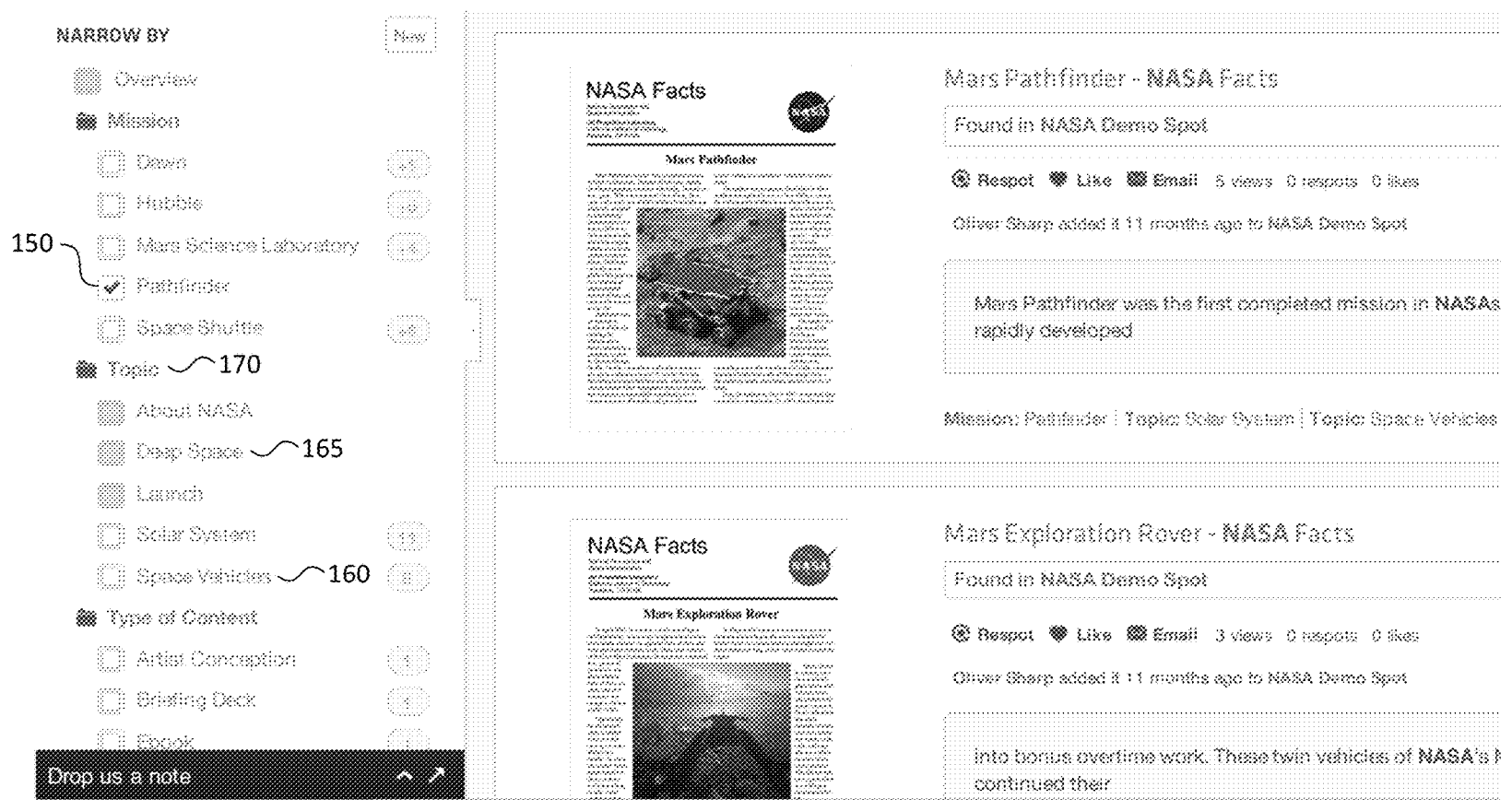

FIG. 1C shows what happens when the user clicks on the checkbox 150 next to the Pathfinder list: the result set has been narrowed to only the 12 items in that list. Note that the result set can be further adjusted by using narrow-by. Eight of the 12 items are also in the "Space Vehicles" list 160, in the "Topic" folder 170. Clicking on that box would further restrict the result set to the eight. Alternatively, another option can be chosen from the "Mission" folder, such as "Hubble." In that case, the system will add the six results that are in the "Hubble" list, indicated by the "+6" count next to that list.

This model may be called "ANDs of ORs," meaning that results will be shown that are in any of the chosen lists within a folder (the logical OR of list membership within a folder) but must be in one of the lists selected in every folder (the logical AND of folder membership). It is possible to use alternative models, such as "ANDs of ANDs," meaning that an item only appears if it is in every list that the user selects. If two lists in a folder are chosen, the item will appear if it is in both of them, rather than in either of them, as is true for the "ANDs of ORs" model.

Note also in FIG. 1C that lists like "Deep Space" in the "Topic" folder have been grayed out and do not show a number. That is because there are no items from the result set in those lists. The system may keep them visible, because it can be jarring for users to have lists and folders moving around and popping in and out of visibility as checkboxes are selected, but it also indicates that they are no longer useful with the restricted result set that is currently being displayed.

Properties

A variety of types of properties can be used to narrow down a set of items. Properties can stand on their own or can be grouped together. For the purpose of the explanation below, the word property list refers to items that have a particular property. When properties are grouped together, the group is a property folder. For any particular result set, the system considers the property lists that correspond to properties held by one or more of those items.

These are the types of properties supported in the system:
User-Defined Properties The system may allow users to use item lists, which can further be organized into folders 110 of lists as shown in, for example, FIGS. 1A-1C. Users can place items into zero, one, or many item lists. An item about the Mars Pathfinder mission can be placed in the "Pathfinder" list in the "Mission" folder, the "Solar System" list in the "Topic" folder, and so forth.

When items are placed in an item list, the system represents that by associating a property with each of those items. Hence, the property list of items containing that property corresponds exactly to the item list. Similarly, if item lists are grouped into item folders, the system groups the corresponding property lists into a property folder.

Item lists and item folders can be created by the user or by another user, or they can be predefined by the system. For example, a collection of case studies might be organized using a "Country" folder, containing a list of names of all the countries in the world.

Lists and folders are only one type of property that users can define. Items are also added to particular collections (i.e., "spots") and can be associated with different authors. In general, users can attach a wide variety of metadata properties to an item, which can consist of strings (like the name of the author), numbers (like a date), colors (as in priority), status (whether an item has been modified), comments, and the like.

User-Defined Properties of Groupings

Figure 2A:
Figure 2B:
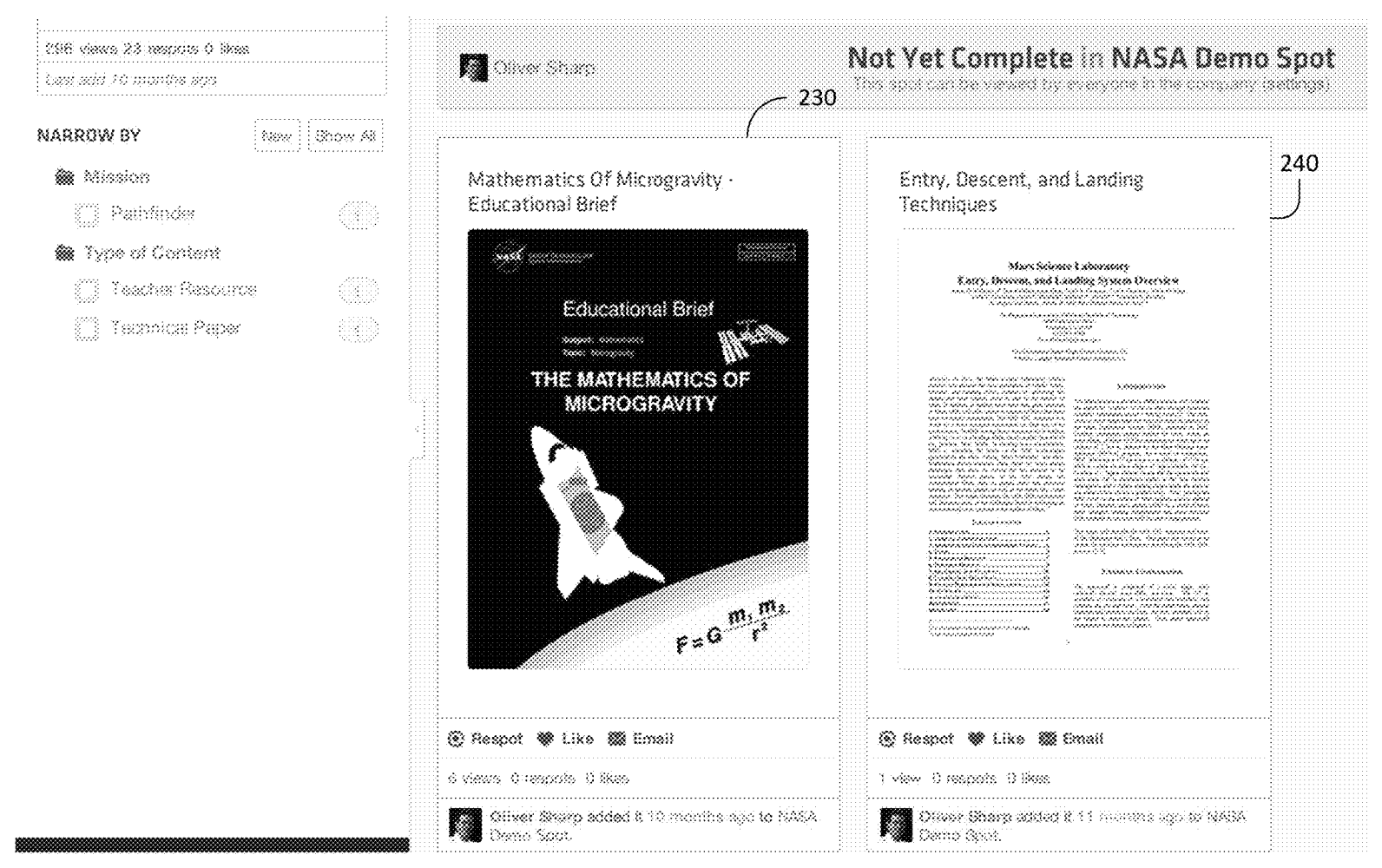

The system may allow the user to specify properties for certain groupings, which then are presented in narrow-by view. For example, in FIG. 2A, a user has specified that the "Topic" folder 210 should be complete. This is an assertion that every item in the spot should appear in at least one of the item lists of the "complete" folder (e.g., "Topic" in this example). If an item is not in any list in that folder, the folder is not yet complete, and the system presents those items to the user in a special system-created list called "Not Yet Complete" 220. When the user has put every item in one or more lists in that folder, the "Not Yet Complete" list 220 becomes empty and will not be displayed. In FIG. 2A, this folder is missing two items. FIG. 2B shows what happens when that system list is selected: the two missing items 230 and 240 are displayed on the right-hand side.

Figure 3:
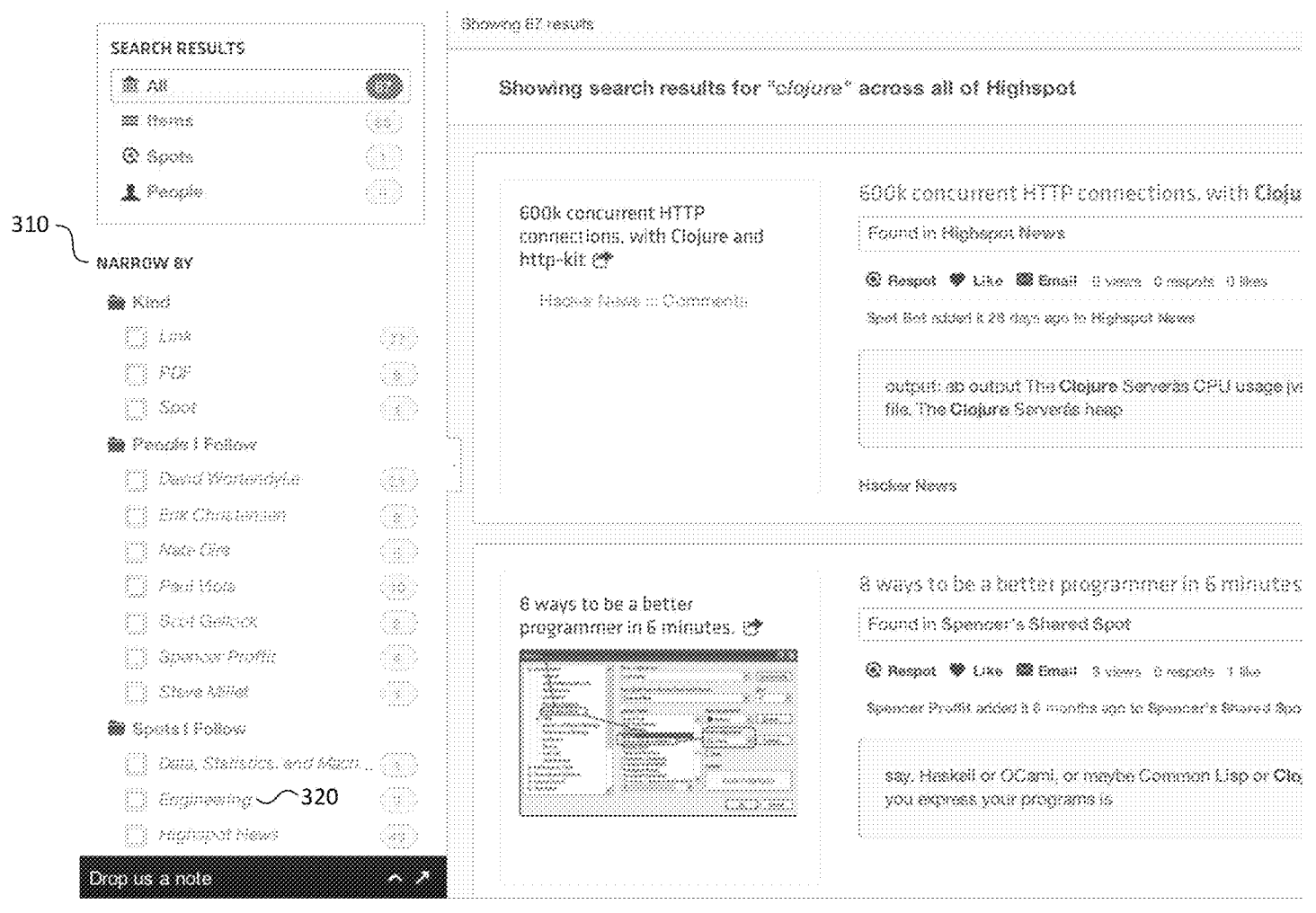

Another kind of user-defined property is shown in FIG. 3. The system allows users to follow spots or people, meaning that the user is interested in a particular collection of information or in the activities of a particular person. The user will see updates and/or activities i) related to that collection and/or ii) performed by that person. In FIG. 3, the user has done a search for the term "clojure," which yielded 87 results. The system has calculated which of the items are in spots that the user follows or were acted on by people the user follows. These are listed in the narrow-by area 310: for example, in this case the user follows the spot "Engineering" 320, which contains 3 of the items in the result set. If the user selects that spot's checkbox, only those 3 items from the original set are displayed. Similarly, the user can click the checkbox of a particular person, and only see the relevant items that the person has acted upon.

Relationships

Figure 4:
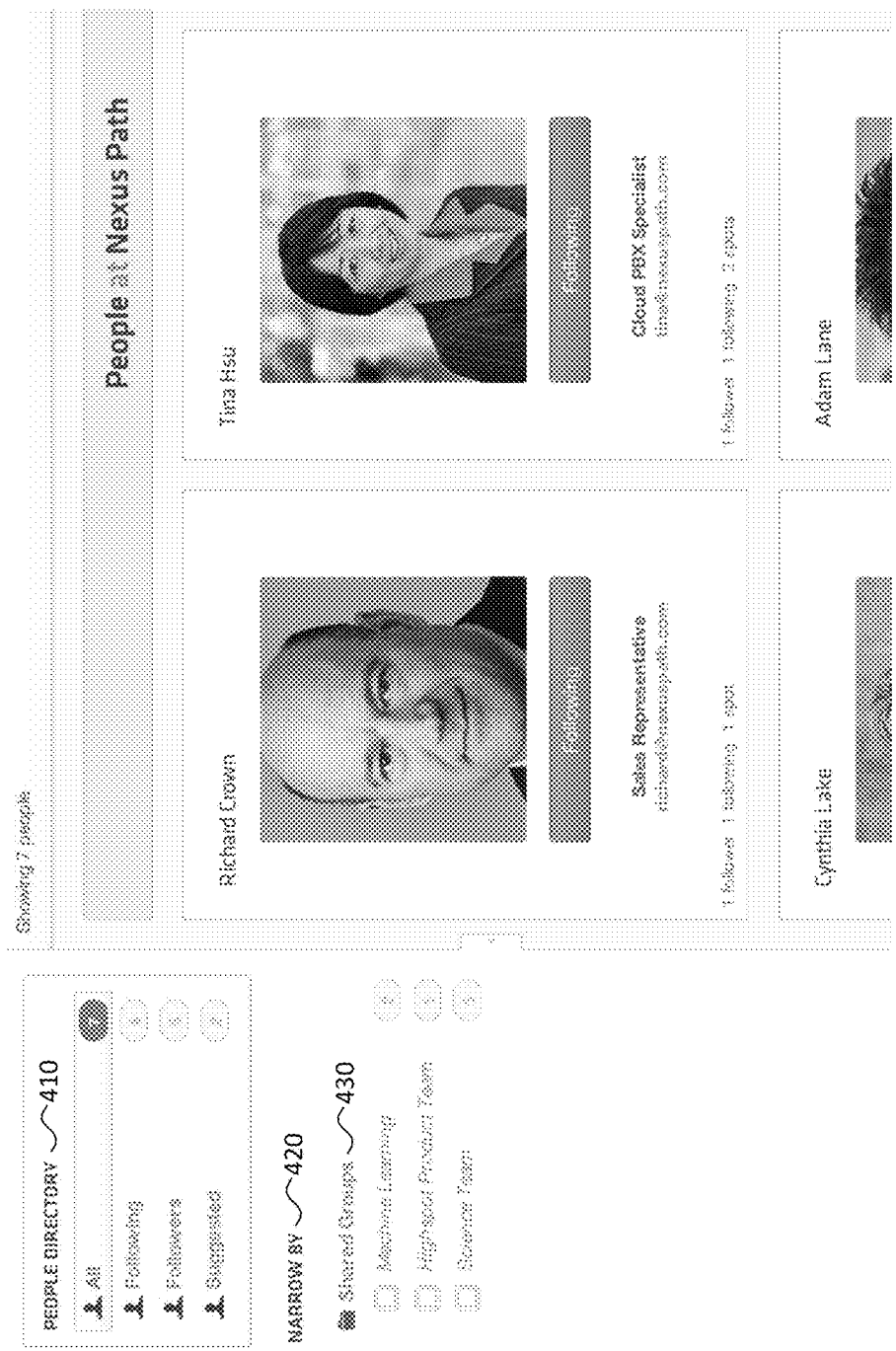
FIG. 4 is a display screen showing a directory of people.

The system may compute properties based on relationships that it knows exist between users. For example, in FIG. 4 the people directory is shown 410, listing people in the system. On the lower left, the narrow-by view 420 shows a section called "Shared Groups" 430, which specifies groups that both the user and some of the other people being shown belong to. The user can narrow down the list of people by selecting a group in order to find the right person in the directory.

Inherent Properties of the Item

Figure 5:
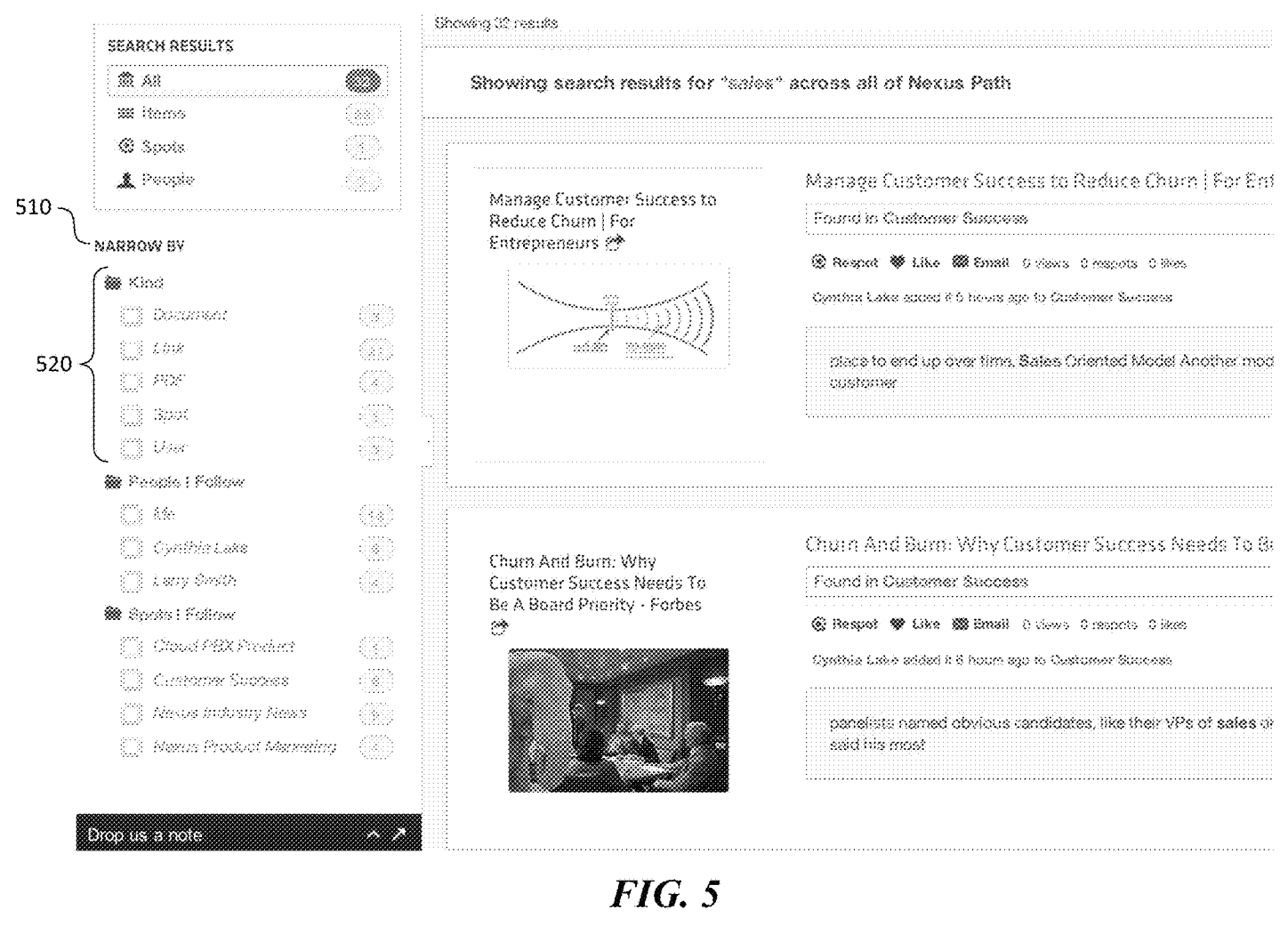

Some characteristics of an item can be computed by analyzing the item. For example, FIG. 5 shows a narrow-by 510 that lists the type or kind 520 of item: Document, Link to a web page, PDF, Spot (i.e., collection of items), and User. Other inherent properties the system could present include the item's length (in bytes, or characters, or pages, or other measurement), the nature of its contents (images, or equations, or what language(s) it is written in, or whether it is a 3D image), the date it was authored or uploaded, and so forth.

User Activities Associated with the Item

The system may allow users to act on items in a variety of ways. For example, items can be added, organized, viewed, edited, commented on, liked, shared with others, or copied into new collections. In addition, the user that performs the acts can have various relationships to the current user; the user might be the current user, or be in a group with the user, or be followed by the user, or be an influential member of the user's community, or have a high affinity to the user that the system has determined through analysis. All of these properties can be used to narrow down a particular result set.

Figure 6:
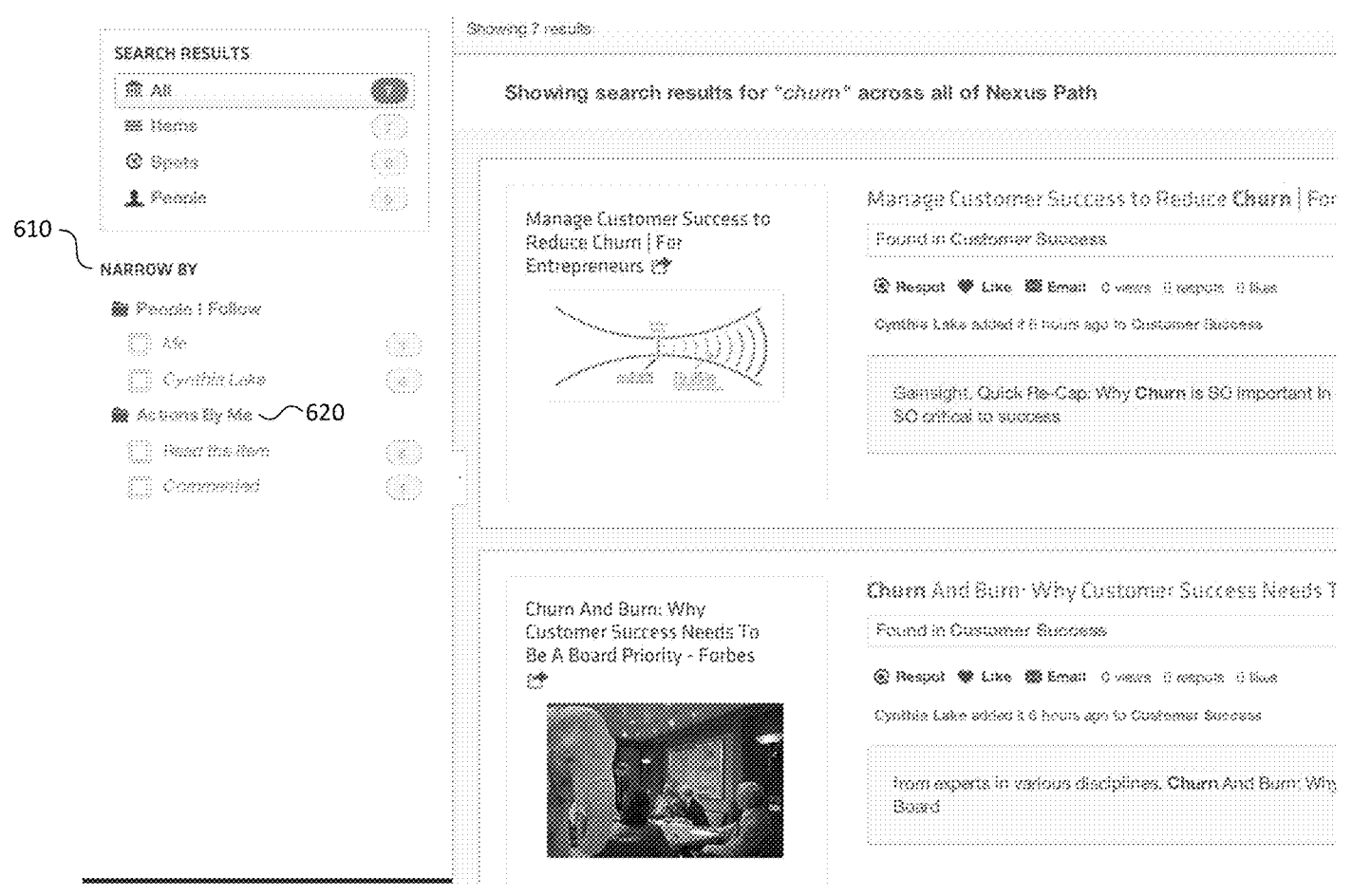

FIG. 6 shows an example where some of the items in the result set have been viewed, commented on, and so forth. In this example, the narrow-by 610 includes "Actions By Me" 620 folder. With a click, the user can narrow down the results to only show, for example, items that he or she has viewed or otherwise interacted with in the past. It could also show "Acted On By" and list people that the user follows. Accordingly, with a click a user can show only those items that somebody the user follows has, for example, commented on or otherwise acted on.

Computed Properties

The system can use a variety of analysis techniques to compute properties of an item. For example, it might use a technique like "basket analysis," which identifies relationships such as finding pairs of items that have been acted on by the same person. Such an analysis identifies affinities between items—it finds pairs of items that are often of interest to the same person, for example.

One way such analyses could be used in narrow-by is to compute a level of affinity between items (e.g. "high," "medium," and "low"). These can be presented as narrow-by options. The same approach could be applied to collections of items, to other people, and so forth.

There are many other kinds of computed properties the system might discover and present to the user: for example, how similar items are to the current item or items being displayed, whether items are different versions of the current item, or whether an item is identical to one that has been sent to the current user in email, perhaps as an attachment.

Presentation

FIG. 1A shows that every list shown in the narrow-by area may have an associated count 125 next to it. This indicates to the user how many of the items in their current result set will continue to be in it if that option is selected.

If the user selects multiple properties within a single property folder, items will be shown that have any of those properties. In FIG. 3, there is a narrow-by section called "Kind." If the user selects both "Presentation" and "PDF," all items of either kind will be included in the result set. To reflect that, once a user has selected one checkbox in a property group, the display for the other properties in that group changes to the form "+N," indicating that clicking on another box will add an additional N items to the result set.

In logic terminology, the semantics are "ANDs of ORs." For example, if the user selects a top-level list called "A," a list "1" in folder "B," and lists "3" and "4" in folder "C," an item will be shown if its properties match the expression ("A" AND "B.1" AND ("C.3" OR "C.4")).

Once the user has selected a property, any other properties that are no longer useful are disabled. In other words, when the new result set contains zero items with that property, or when every member of the new result set has the property, it is no longer helpful for further refining the result set. FIG. 1C demonstrates this, as described above. After the user selected "Pathfinder" 150, none of the 12 remaining items were in the list "Deep Space" 165, so it was disabled in narrow-by. If the user unselects "Pathfinder," "Deep Space" 165 is re-enabled as a selection option.

Applications

Narrow-by can be applied in a wide range of applications. In each of these applications, the items may represent a file (such as a presentation), a link to a web page, a person, a collection of items, or other entity that a user may wish to interact with.

Search—FIG. 1B shows the result of a search within a collection of items. FIG. 3 shows a search across multiple collections of items. In each case, the system identifies properties of the items in the result set that can be used to refine the search.

Browse—FIG. 2B shows the result of clicking on "Not Yet Complete," a system-defined list in a space exploration spot. Note that the items that are in that list have other properties that can be used to further refine the result set. Items may have a "Type of Content," which is a user-defined list. In this case, the two items being displayed represents two different types of content. The system mixes together user-defined and system-defined lists to help users quickly identify the set of items that they are interested in.

Figure 7:
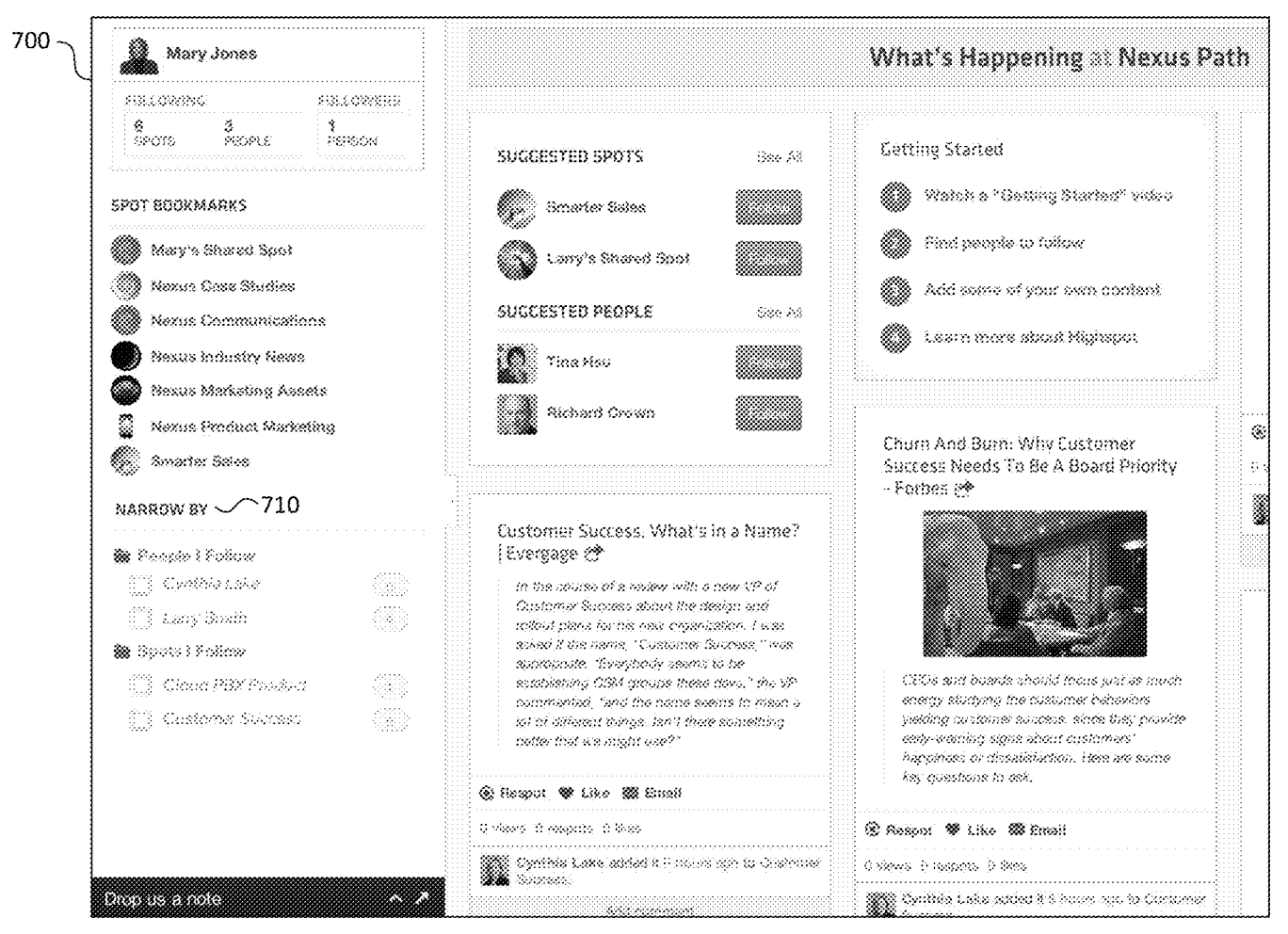

Discover—The system can auto-suggest a set of items, through a feed, as shown in FIG. 7. The feed 700 contains those items that the system believes the user may find interesting, based on previous activity, social relationships, and the like. The items on the feed can be refined based on narrow-by 710 options. In this case, the system identifies which items in the feed come from spots or people the user is following. It can also show any of the other properties that have been mentioned elsewhere in this document.

Once the result set is narrowed down, the user can apply various operations to the results. For example, the user might view them, or download them to a computer or a device, or copy them to a different collection, or delete them, or add them to a user-defined grouping such as a list.

Implementation

The system can be implemented by using an indexing system supporting faceting, such as Lucene/SOLR. Faceting is a feature of an index that computes how many of the result values have a particular characteristic. Lucene allows facets to be manifest, meaning that they have been explicitly attached to an item and placed into the index, or computed, meaning that they are calculated during the query process.

Query the Index for Faceted Results

1. In Lucene, items are associated with a set of fields that are used for faceting. The system creates one for every manifest facet that will be presented to the user. For example, if the user places an item in a list, that is stored in a field. Other examples include the spot that the item belongs to, who created the item, who has viewed the item, and so forth.

2. Based on the context that the result is being used in, the system determines which fields to perform faceting on. For example, take the lists and folders that a user defines within a spot (such as "Mission" and "Pathfinder" in FIG. 1A). If the user searches for items within that spot, those lists and folders will be shown to the user as appropriate for narrowing the results, and hence they need to be fields that faceting is applied to. However, if the user searches for items across multiple spots, the folders and lists inside those spots may use the same names for conflicting meanings and so displaying them may be confusing. For example, there might be another spot about landmarks, and a "Mission" in that context might refer to religious outposts constructed by the Spanish in California. To avoid grouping together names from different contexts, which might conflict, the system does not show list or folder properties from different spots in the same context. Hence, the list and folder property fields need not be faceted for that kind of search. FIG. 3 shows a search across multiple spots—it looks for matching items across the entire domain—and the narrow-by area only shows properties that are known to be applicable across spots, such as the type of content or who owns it.

3. Next, the system builds up the Lucene query. It requests that the return values be faceted in two ways:

Each of the fields chosen in step 2 is listed as a field facet.

Any computed facet is represented as a query facet. For example, the "advanced folder" semantics shown in FIG. 2A (e.g., "Not Yet Completed") are based on how many lists a particular item is in. If a folder is marked as "complete," every item is supposed to be in a list in that folder. If it is marked as "exclusive," no item should be in more than one list. Exceptions are included in system lists called "Not Yet Complete" (for items in no list) and "Not Yet Exclusive" (for items in multiple lists). The system computes these system lists using query facets. It does so by creating a temporary field per item for each folder. As the query is computed, the system tracks how many lists within that folder contain the item, using a value that is one of {0, 1, and "many"}. The query then facets on that calculated field being equal to 0 (meaning the item is in no lists) and "many" (meaning the item is in multiple lists). These facets then represent the count for the two lists "Not Yet Complete" and "Not Yet Exclusive."

4. Submit the query.

Post-Process Query Results

Lucene Returns:

The result set containing items that match the query.

A table listing the facet folders and lists, with counts. For example, in FIG. 1B, Lucene has computed the set of items within the NASA spot that contain the term "NASA." The facet count shows the folders and lists that these items are in. In this example, 12 of them are in the "Pathfinder" list within the "Mission" folder).

The system can now mask particular facets, based on what it chooses to display to the user. For example, the system might decide to show a maximum of five lists in a particular folder, perhaps choosing those lists that have the largest number of items in them.

The system can also compute values that are not stored in the Lucene index. For example, if the user is following a set of spots, that information is not in the index. The system takes the set of spots that the items are in, and looks up the ones that the user has chosen to follow. These are then displayed as options for the user to select, as shown in FIG. 3 (in the area titled "Spots I Follow").

The results are then rendered, with the facets shown on the left-hand side, organized into folders and lists. Each list shows a checkbox next to it that the user can select.

Respond to User Selection of Checkboxes

When the user clicks on a checkbox, it can be one of the following:

Top Level List, as the Only Selection

A "top-level" list represents a stand-alone property that has not been grouped. By selecting it, the user is requesting that only items with this property to be displayed.

The system resubmits the query to Lucene, specifying that this property be present. If the property corresponds to a field facet, the system changes the facet request into a filter. Lucene will only return items that match. If the property corresponds to a query facet, the system creates a custom filter that first computes the value (as above) and then filters out items that do not match.

The counts on all the properties are updated to match the facet values returned from the new query. If a property is no longer useful (i.e., the new result list has zero items with the property or all the items in the new result list have the property) it is disabled for selection.

A Top-Level List, after Something Else was Already Selected Previously

Take the query that was submitted last, and extend it with an AND clause. For example, suppose that a top-level list "A" was selected earlier and now top-level list "B" is being selected. The new query would add the filter ("A" AND "B"), matching only items that have both of those properties.

First List in a Folder

Extend the existing filter, if there is one, with the selected property. Then, resubmit the query once for each other list in the folder, specifying each as a filter. Track the size of the result set. When displaying the other checkboxes, show the delta for each. FIG. 1C shows an example of how the system displays this visually (e.g., "+6" for "Hubble").

To use a simplified example for explanation, suppose a folder "A" contains four lists, "1," "2," "3," and "4," and that such grouped properties are represented in Lucene as "<Folder>.<List>." If the user selects list "1," create four queries. Execute the first one, which contains the filter specifying that Lucene should only return items that contain property "A.1." Suppose there are 10 results from that query.

Next, execute a query for items that contain ("A.1" OR "A.2"). Suppose that there are 12 items. Next to item 2, display "+2" so the user knows that clicking on the additional list will add two items. Similarly, execute queries for ("A.1" OR "A.3") and ("A.1" OR "A.4").

Another List in a Folder, after One has Already been Selected

As above, execute a query that specifies each of the selected lists with an OR clause. And resubmit the query for every unchecked list to compute the counts.

For example, suppose there is a top-level list "B" and a folder "C" that contains lists "1," "2," and "3." The user already selected the top-level list and list "1." Now, list "2" is also selected. The initial query to submit is ("B" AND ("C.1" OR "C.2")). This represents items that are in list B and in list 1 or list 2 of folder C. Suppose there are five results. Then submit ("B" AND ("C.1" OR "C.2" OR "C.3")), and suppose there are eight results. The system would then display the five results from the first query and would place a "+3" next to list "3."

Enhancements

The system can be enhanced by automatically suggesting which lists or properties the user might find most effective to use narrow-by. This could be based on analyzing the history of the user's prior activity, knowing, for example the users or collections whose content is most likely to be of interest. The system could sort those "suggested" properties to appear earlier, or it could color code them so that they are more visually prominent.

Figure 8:
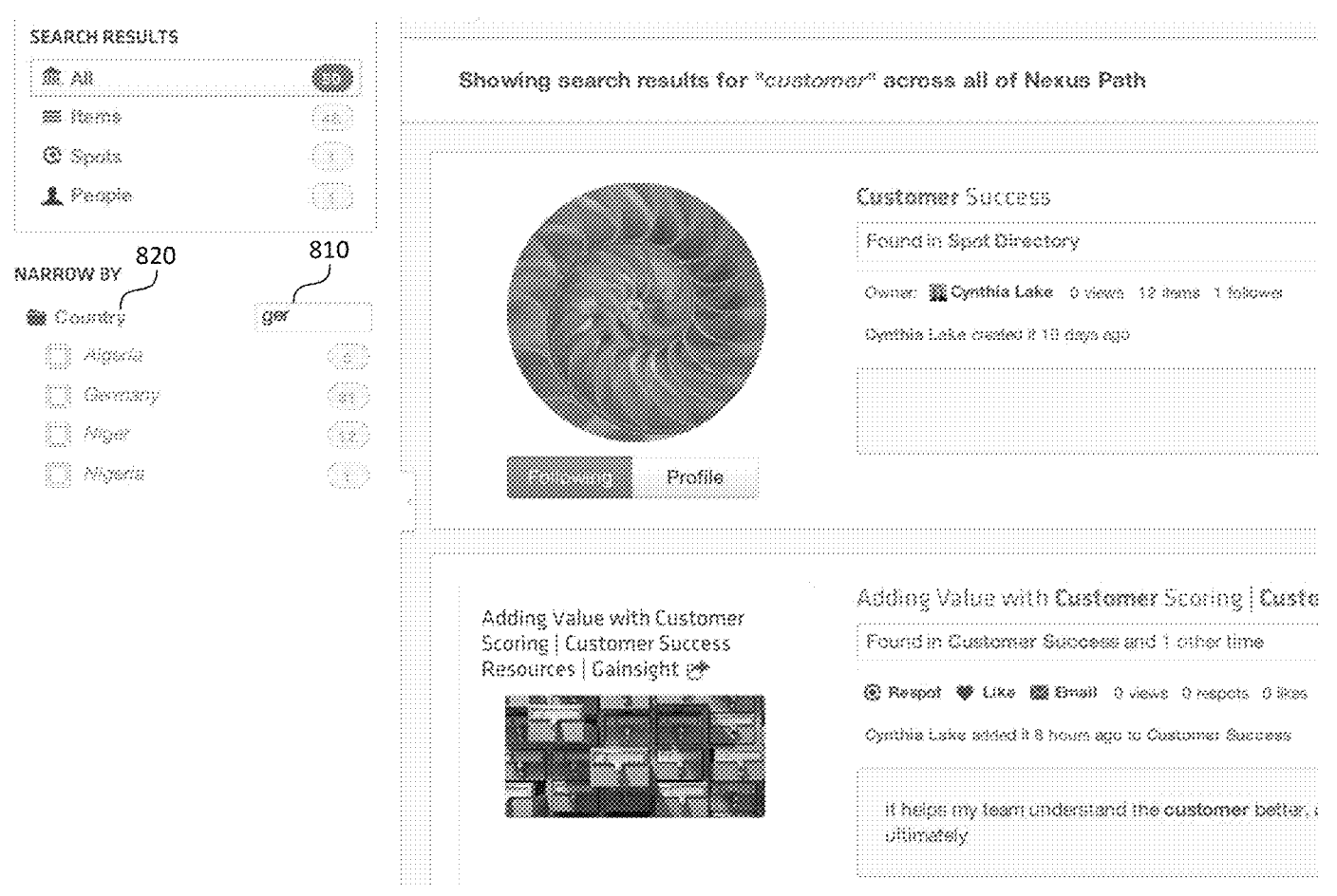

The system can handle large numbers of properties by presenting a search box 810 to the user, rather than listing them explicitly. For example, see FIG. 8, where items have been given a property to reflect which of 300 countries are relevant to it. The countries have been grouped together into an item folder called "Country" 820. Next to the folder name, in this example, there is a search box. If the user wishes to find, say, Germany, he or she can type in the search box. As shown in the Figure, the system will then show every item list in the Country folder that matches the phrase that was typed. In this example, the user has typed "ger" in the search box, and four countries that have those letters as part of their names are displayed. The user can keep typing to narrow the list down further. When the desired country has been found, the user can select it; in this case, by clicking the "Germany" checkbox, only the 31 items in the list will be displayed.

Another feature is that if a user selects an item, the properties the item has can be denoted visually (by, for example, turning them blue and making them bold). This allows the user to quickly identify items similar to the one of interest, by selecting particular properties that the one of interest has. The result set will narrow down to the others that share that property.

Figure 9A:
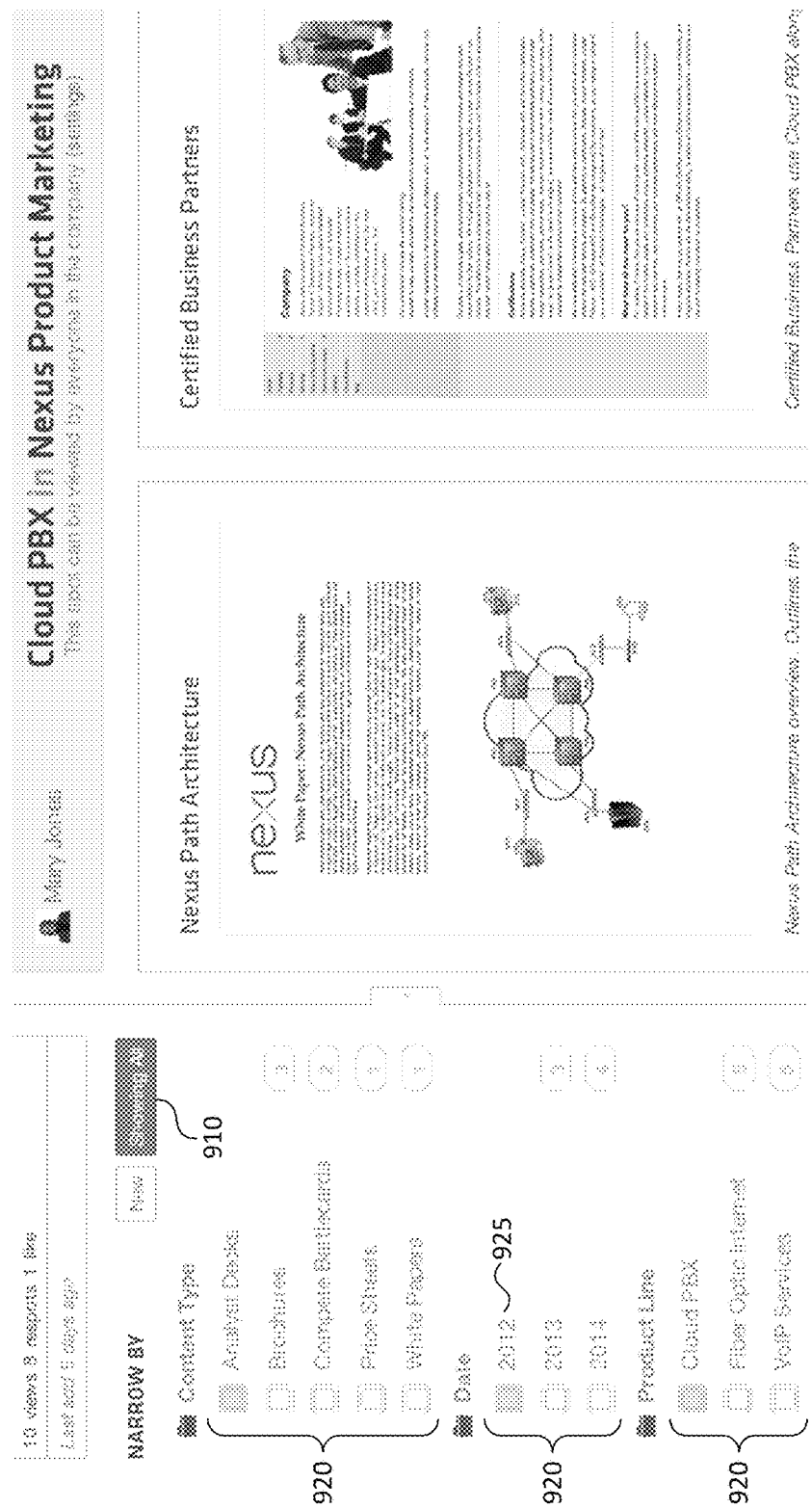
FIGS. 9A and 9B are display screens showing how the system may handle multiple properties being shown to a user.
Figure 9B:
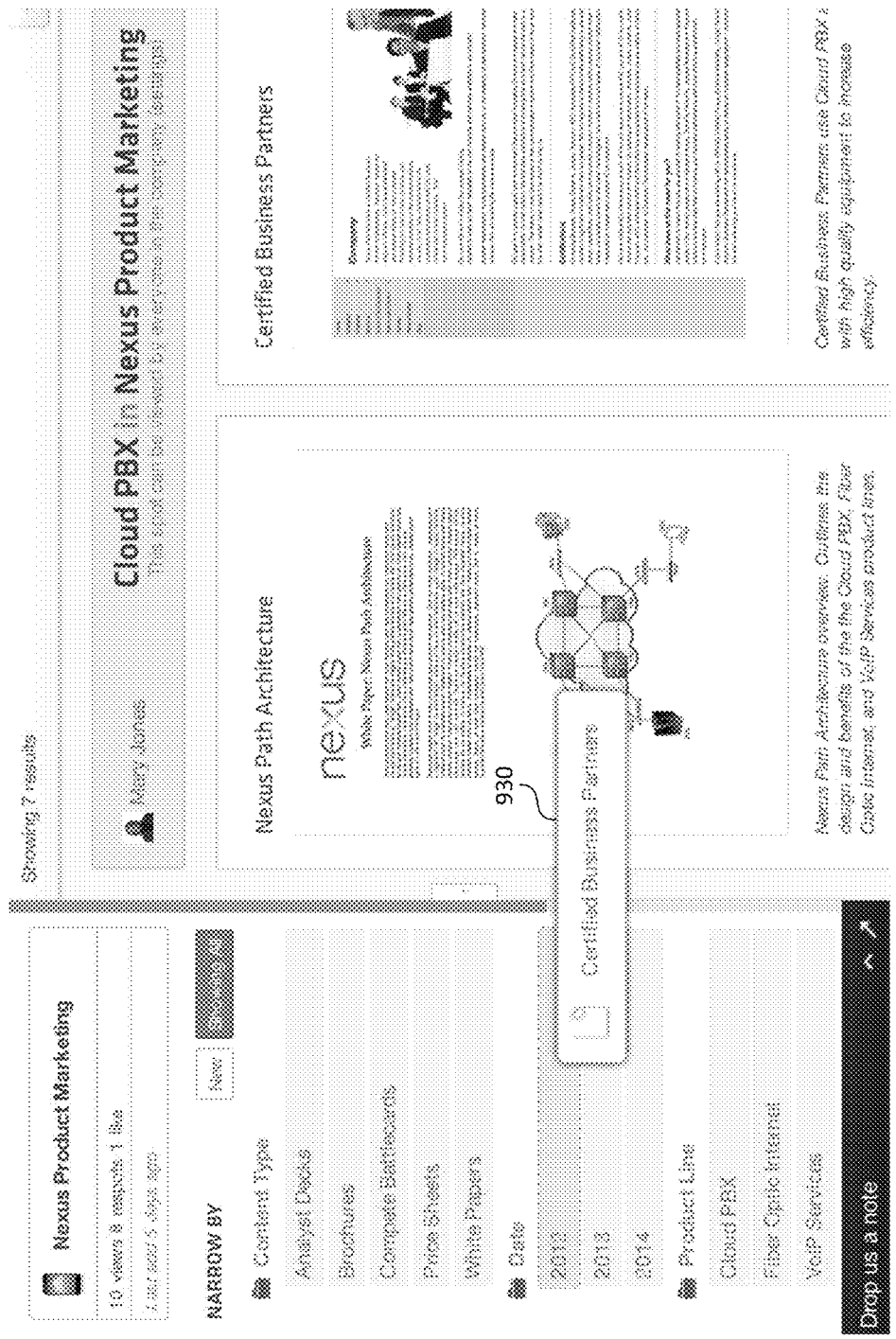

The user can request that all properties be shown, even if they are not useful. This allows the set of properties to be edited, and the item to be dragged on top of properties that it does not have in order to associate the item with the properties. FIG. 9A shows the result of clicking the "Show All" button 910 next to the words "Narrow By"-note that the button 910 has been highlighted and switched to say "Showing All." Now all the lists are shown, including the year 2012 list 925 in the "Date" folder, which holds none of the items currently being displayed. FIG. 9B shows an item 930 being dragged to that list, which will associate the dragged item and the "dragged to" list with each other. This allows an editor to add items to any list even when the narrow-by view is being displayed.

Figure 10:
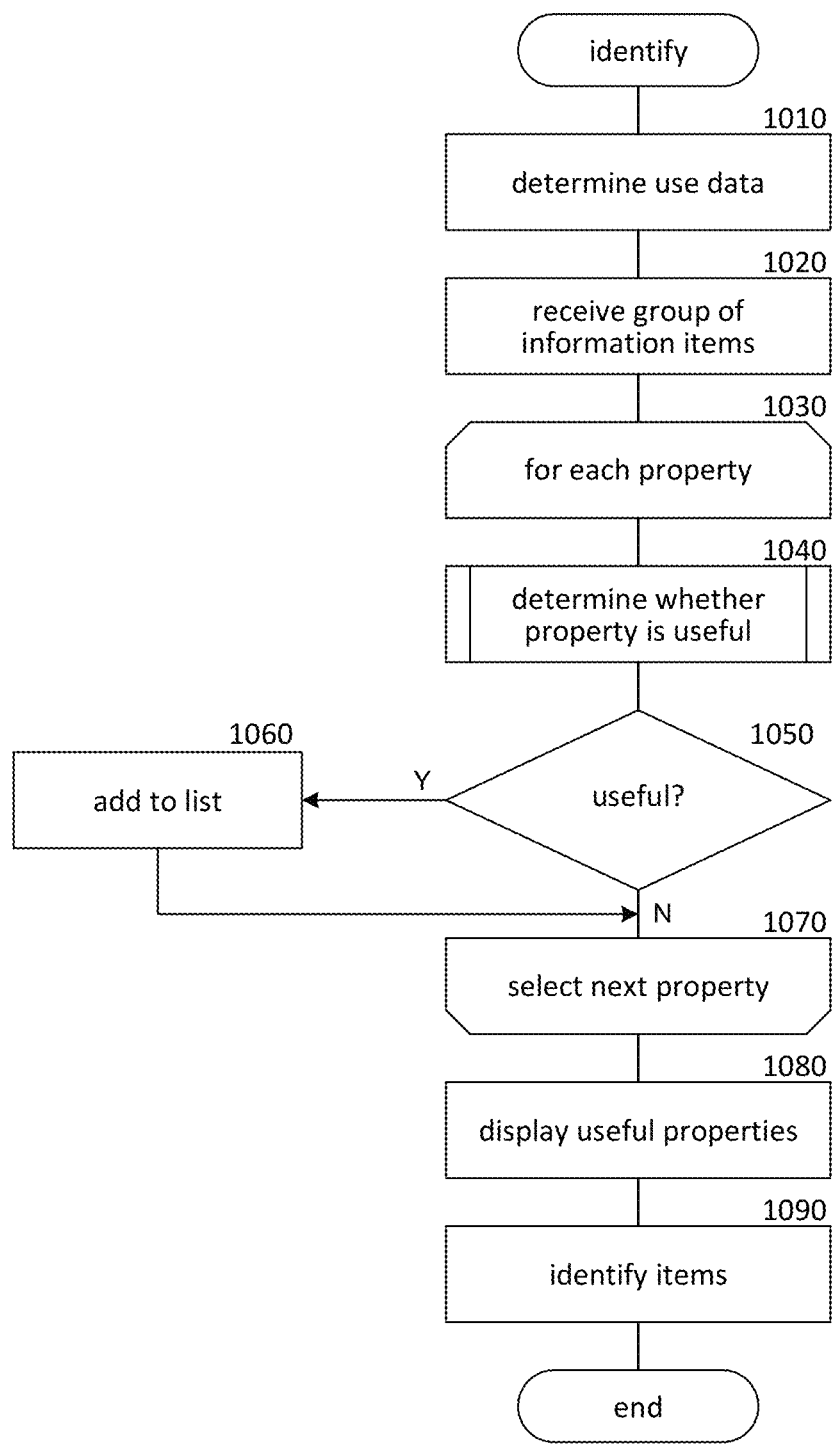
FIG. 10 is a block diagram illustrating the processing of an identify information items component.

FIG. 10 is a block diagram illustrating the processing of an identify information items component in accordance with some embodiments of the disclosed technology. The facility invokes the component to identify information items based on useful properties among a set of properties. In block 1010, the component determines use data characterizing relationships among information. For example, the component may determine how users have interacted with information items within an organization, relationships between information items, relationships between users, relationships between information items and users, accessibility or privileges information, and so on. In block 1020, the component receives an indication of a group of information items, such as a group of information items accessible by a particular user, metadata pertaining to the information items, links to the information items, a listing of the information items, and so on. In blocks 1030 to 1070, the component loops through each of a set of properties to identify useful properties. The properties may be culled from properties associated with the group of information items. In block 1040, the component invokes a determine property usefulness component to determine whether the currently-selected property is useful. In decision block 1050, if the property is determined to be useful, then the component continues at block 1070, else the component continues at block 1060. In block 1060, the component adds the currently selected property to a list of useful properties. In block 1070, the component selects the next property and then loops back to block 1030. If all of the properties have already been selected, then the component continues at block 1080. In block 1080, the component provides an indication of useful properties, such as displaying or sending a list of the useful properties. In block 1090, the component identifies information items associated with the useful properties. For example, the component may identify items that match one or more selected useful properties, such as useful properties selected by a user. In some embodiments, a means for identifying information items is one or more computers or processors configured to carry out the algorithm disclosed in FIG. 10 and this paragraph.

Figure 11:
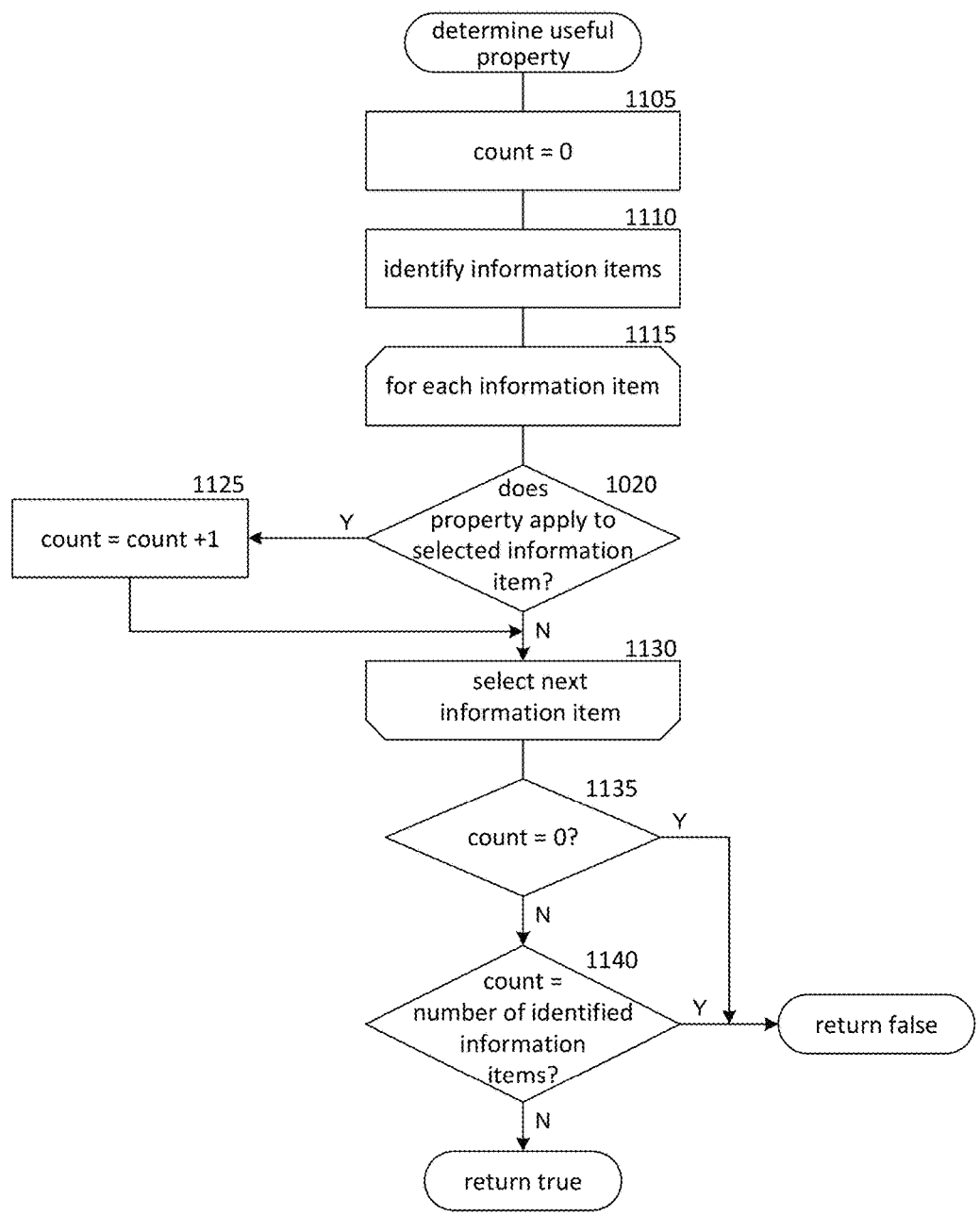
FIG. 11 is a block diagram illustrating the processing of a determine property usefulness component.

FIG. 11 is a block diagram illustrating the processing of a determine property usefulness component in accordance with some embodiments of the disclosed technology. The facility invokes the component to determine whether a particular property is useful. In block 1105, the component initializes a count variable to zero. In block 1110, the component identifies relevant information items, such as a group of information that a user is interacting with, information items identified as a result of a search or query, information items accessible to the user, all information items within an organization, and so on. In blocks 1115 to 1130, the component loops through each information item to determine whether the property applies to the information item. In decision block 1120, if the property applies to the currently-selected information item then the component continues at block 1125, else the component continues at block 1130. In block 1125, the component increments the count variable. In block 1130, the component selects the next information item and then loops back to block 1115. If all of the information items have already been selected, then the component continues at block 1130. In decision block 1135, if the count variable is equal to zero, then the component returns false and completes, else the component continues at decision block 1140. In decision block 1140, if the count variable is equal to the number of information items identified in block 1110, then the component returns false and completes, else the component returns true and completes. In some embodiments, a means for determining property usefulness is one or more computers or processors configured to carry out the algorithm disclosed in FIG. 11 and this paragraph.

CONCLUSION

Figure 12:
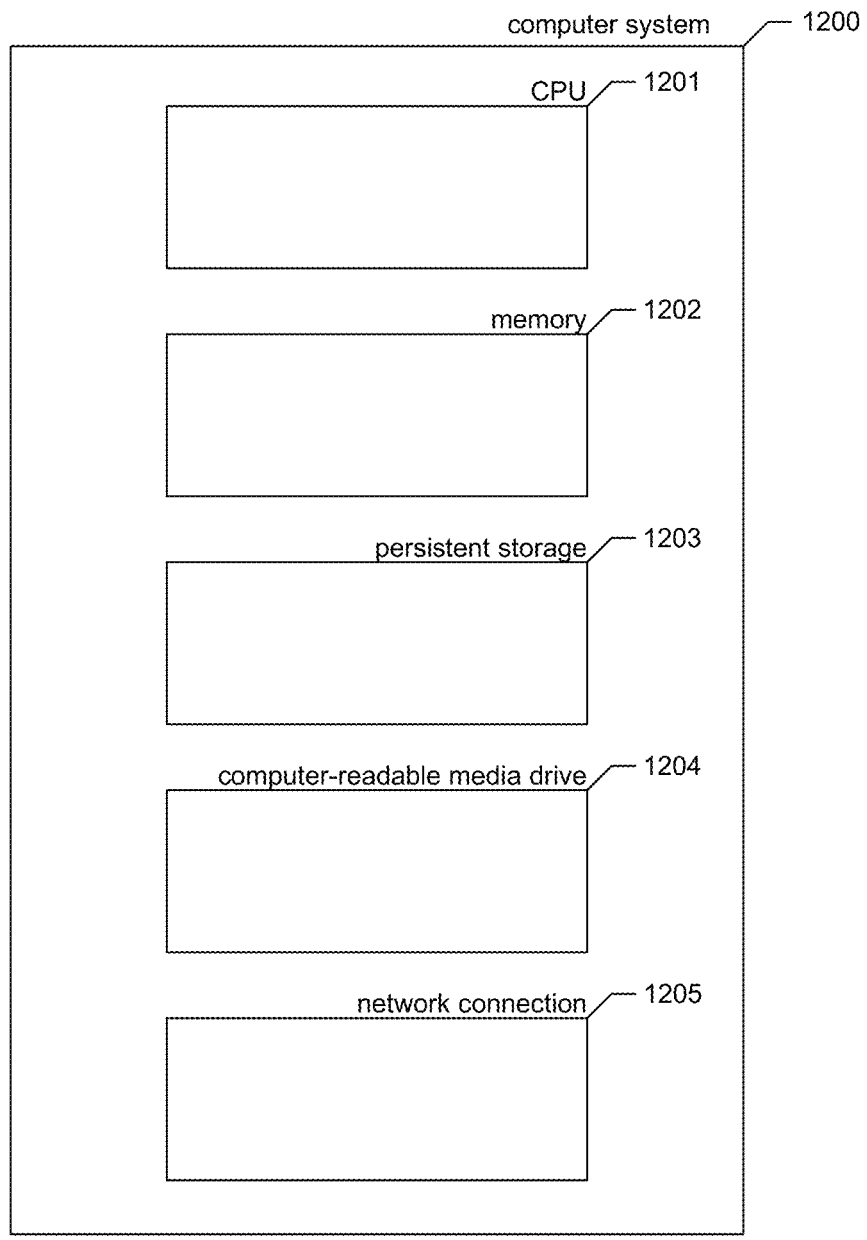
FIG. 12 is a block diagram illustrating some of the components that may be incorporated in at least some of the computer systems and other devices on which the system or facility operates and with which the system or facility interacts.

FIG. 12 is a block diagram illustrating some of the components that may be incorporated in at least some of the computer systems and other devices on which the system operates and interacts with in some examples. In various examples, these computer systems and other devices 1200 can include server computer systems, desktop computer systems, laptop computer systems, netbooks, tablets, mobile phones, personal digital assistants, televisions, cameras, automobile computers, electronic media players, and/or the like. In various examples, the computer systems and devices include one or more of each of the following: a central processing unit ("CPU") 1201 configured to execute computer programs; a computer memory 1202 configured to store programs and data while they are being used, including a multithreaded program being tested, a debugger, the facility, an operating system including a kernel, and device drivers; a persistent storage device 1203, such as a hard drive or flash drive configured to persistently store programs and data; a computer-readable storage media drive 1204, such as a floppy, flash, CD-ROM, or DVD drive, configured to read programs and data stored on a computer-readable storage medium, such as a floppy disk, flash memory device, a CD-ROM, a DVD; and a network connection 1205 configured to connect the computer system to other computer systems to send and/or receive data, such as via the Internet, a local area network, a wide area network, a point-to-point dial-up connection, a cell phone network, or another network and its networking hardware in various examples, including routers, switches, and various types of transmitters, receivers, or computer-readable transmission media. While computer systems configured as described above may be used to support the operation of the facility, those skilled in the relevant art will readily appreciate that the facility may be implemented using devices of various types and configurations, and having various components. Elements of the facility may be described in the general context of computer-executable instructions, such as program modules, executed by one or more computers or other devices. Generally, program modules include routines, programs, objects, components, data structures, and/or the like configured to perform particular tasks or implement particular abstract data types and may be encrypted. Moreover, the functionality of the program modules may be combined or distributed as desired in various examples. Moreover, display pages may be implemented in any of various ways, such as in C++ or as web pages in XML (Extensible Markup Language), HTML (HyperText Markup Language), JavaScript, AJAX (Asynchronous JavaScript and XML) techniques or any other scripts or methods of creating displayable data, such as the Wireless Application Protocol ("WAP").

The following discussion provides a brief, general description of a suitable computing environment in which the invention can be implemented. Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave, a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular numbers respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternatives or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference, including U.S. patent application Ser. No. 14/136,322, filed Dec. 20, 2013. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. In some cases, various steps in the algorithms discussed herein may be added, altered, or removed without departing from the disclosed subject matter. Those skilled in the relevant art will appreciate that features described above may be altered in a variety of ways. For example, the order of the logic may be rearranged, sublogic may be performed in parallel, illustrated logic may be omitted, other logic may be included, etc.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A computer-implemented method of identifying information of interest within an organization, the method comprising:
   determining use data that characterizes relationships among information items within an organization and relationships between the information items and users within the organization,
      wherein the information items within the organization include user data and collections of information items,
      wherein each information item is a document, a presentation, a video, an image, or a webpage,
      wherein the organization includes a structured body of users with associated roles within the organization and who have access to the information items within the organization, and
      wherein each of the information items within the organization includes one or more properties from a group of properties;
   receiving an indication of a first group of one or more of the information items within the organization;
   for each of a plurality of properties of the group of properties,
      determining whether the property is a useful property at least based on whether the property applies to a non-zero proper subset of the information items of the first group of one or more of the information items within the organization;
   for each of one or more of the determined useful properties,
      displaying an indication of the determined useful property;
   receiving, from a first user, a selection of one or more useful properties;
   based at least in part on the received selection, identifying information items of the first group of one or more of the information items within the organization that apply to the selected one or more useful properties; and
   displaying an indication of one or more of the identified information items of the first group of one or more of the information items within the organization that apply to the selected one or more useful properties.

2. The computer-implemented method of claim 1, wherein at least one property of a first information item is specified by the first user.

3. The computer-implemented method of claim 2, wherein at least one property of the first information item is computed automatically by a system based at least in part on activities performed with respect to the first information item.

4. The computer-implemented method of claim 3, further comprising:
   receiving, from the first user, information indicating a change to the at least one property of the first information item specified by the first user; and
   receiving, from the system, information indicating a change to the at least one property of the first information item computed automatically by the system based at least in part on activities performed with respect to the first information item.

5. The computer-implemented method of claim 1, wherein receiving the selection of one or more useful properties includes receiving at least one selection of a group of useful properties.

6. The computer-implemented method of claim 1, further comprising:
   receiving, from the first user, an indication of one or more properties selected by the first user; and
   displaying, in conjunction with the displayed indication of the determined useful properties, an indication of the one or more properties selected by the first user.

7. The computer-implemented method of claim 1, wherein the first group of one or more of the information items within the organization is a list of search results generated in response to a query.

8. A computer-readable hardware device storing instructions that, when executed by a computing system having a processor, cause the computing system to perform a method of displaying information of interest to a user within an organization, the method comprising:
   filtering the information based on a set of properties,
      wherein the information includes a set of information items with which the user is interacting,
      wherein each information item is a document, a presentation, a video, an image, or a webpage, and
      wherein the properties include user-specified properties, properties based on actions taken by other users with respect to the information items, or related properties grouped together;
   automatically determining useful properties based at least in part on the non-zero proper subset of the information items to which the properties apply, wherein at least one of the useful properties is associated with metadata of the set of information items with which the user is interacting, wherein at least one of the useful properties is associated with relationships between the user and other users, and wherein at least one of the useful properties is associated with content of the set of information items with which the user is interacting, and providing the useful properties to permit the user to select from among the provide useful properties.

9. The computer-readable hardware device of claim 8, wherein the provision of useful properties includes presenting information regarding how many information items will remain when one or more of the useful properties are selected, and wherein the provision of useful properties includes presenting information regarding how many information items will be added when one or more of the useful properties are selected.

10. The computer-readable hardware device of claim 8, wherein automatically computing useful properties includes determining relationships among information items within an organization, wherein the information items include user data and collections of information items, and wherein the organization includes a structured body of users with associated roles within the organization and who have access to the information items.

11. The computer-readable hardware device of claim 8, wherein automatically computing useful properties comprises:

for each of a plurality of properties,
determining whether the property applies to at least one of the information items of the set of information items with which the user is interacting, and
determining whether the property applies to less than all of the information items of the set of information items with which the user is interacting.

12. A computing system for identifying information of interest within an organization, the computing system comprising:

a component configured to determine use data that characterizes relationships among information items within an organization and relationships between the information items and users within the organization, wherein the information items within the organization include user data and collections of information items, wherein each information item is a document, a presentation, a video, an image, or a webpage, wherein the organization includes a structured body of users with associated roles within the organization and who have access to the information items within the organization, and wherein each of the information items within the organization includes one or more properties from a group of properties;

a component configured to receive an indication of a first group of one or more of the information items within the organization;

a component configured to, for each of one or more useful properties, display an indication of the determined useful property, wherein a property is determined to be a useful property based at least on whether the property applies to a non-zero proper subset of the information items of the first group of one or more of the information items within the organization;

a component configured to receive a selection of one or more useful properties;

a component configured to, based at least in part on the received selection, identify information items of the first group of one or more of the information items within the organization that apply to the selected one or more useful properties; and a component configured to provide an indication of one or more of the identified information items of the first group of one or more of the information items within the organization that apply to the selected one or more useful properties.

13. The computing system of claim 12, wherein the first group of one or more of the information items within the organization is automatically suggested to the first user by the computing system.

14. The computing system of claim 12, wherein the first group of one or more of the information items within the organization is automatically suggested to the first user by the computing system based at least in part on interests of the first user.

15. The computing system of claim 12, wherein the first group of one or more of the information items within the organization is automatically suggested to the first user by the computing system based at least in part on previous activity of the first user.

16. The computing system of claim 12, wherein the first group of one or more of the information items within the organization is automatically suggested to the first user by the computing system based at least in part on previous social relationships of the first user.

17. The computing system of claim 12, wherein a first property of a first information item is specified by a user, wherein a second property of the first information item is computed automatically by the computing system based at least in part on activities performed with respect to the first information item, and wherein a third property of the first information item is inherent to the first information item.

18. The computing system of claim 12, further comprising:

for a component configured to determine property usefulness for each of a plurality of properties of the group of properties.

19. The computing system of claim 18, further comprising:

a component configured to, for each determined useful property, provide an indication of the determined number of the information items of the first group of one or more of the information items within the organization to which the property applies.

20. The computing system of claim 12, further comprising:

a component configured to receive, from the user, a query for one or more properties; and a component configured to identify properties that at least partially match the received query.

\* \* \* \* \*